United States Patent [19]

Frazier et al.

[11] Patent Number: 4,705,361
[45] Date of Patent: Nov. 10, 1987

[54] SPATIAL LIGHT MODULATOR

[75] Inventors: Gary A. Frazier, Garland; William R. Frensley, Richardson; Mark A. Reed, Dallas, all of Tex.

[73] Assignee: Texas Instruments Incorporated, Dallas, Tex.

[21] Appl. No.: 802,637

[22] Filed: Nov. 27, 1985

[51] Int. Cl.$^4$ ............................................. G02F 1/015
[52] U.S. Cl. .................................. 350/355; 332/7.51; 350/164; 357/16
[58] Field of Search ................ 350/355, 356, 1.6, 164, 350/166; 332/7.51; 357/16, 17

[56] References Cited

U.S. PATENT DOCUMENTS 4,525,687 6/1985 Chemla et al. ...................... 350/355

Primary Examiner—Bruce Y. Arnold
Attorney, Agent, or Firm—Carlton H. Hoel; Leo N. Heiting; Melvin Sharp

[57] ABSTRACT

A light modulator and a high speed spatial light modulator (230) with each pixel (231) made of stacked quarter wavelength layers (232, 234) of heterogeneous material. Each layer (232, 234) is composed of periodic quantum well structures whose optical constants can be strongly perturbed by bias on control electrodes (240, 242). The control electrodes (240, 242) act to either remove light absorbing electrons from the layer or to inject them into each layer. The effect is to produce either a highly relecting mirror or a highly absorbing structure. The spatial light modulator (230) is compatible with semiconductor processing technology. Also, a modulator invoking the Burstein effect in the form of a stack of p-n diodes is disclosed.

20 Claims, 31 Drawing Figures

EMPTY LOW LEVELS MEANS
NO OPTICAL ABSORPTION

FULL LOWER LEVELS
CAUSE

STRONG OPTICAL
ABSORPTION $h\nu = E_b - E_a$

SPATIAL LIGHT MODULATOR

BACKGROUND OF THE INVENTION

The present invention relates to optical devices, and, more particularly, to light modulators of varying carrier densities in semiconductor materials.

Highly reflective mirrors made of alternating layers of non-absorbing materials are well known; see Jenkins and White, Fundamentals of Optics, ch 14 (McGraw Hill 1957), and FIG. 1A for a schematic perspective view of such a mirror and FIG. 1B for a graph of the reflectance. In such mirrors the two layer types have different optical constants ("n" is the index of refraction and "k" the attenuation so that $\epsilon = (n+ik)^2$); and because there is a discontinuity in the optical constants at each layer interface, light which enters the mirror undergoes multiple reflections. If the optical thickness of each layer is chosen correctly (a quarter wavelength plus optional multiples of a half wavelength), the reflected rays will be in phase as illustrated in FIG. 1C and the mirror will have high reflectivity as illustrated in FIG. 1B. Narrow band reflectivity of 98% is routinely obtained in such multilayer structures.

To make such a multilayer mirror efficient, the optical absorption of each layer must be very small. Otherwise, significant optical absorption will take place within each layer and the subsequent multiple reflections within the mirror will further reduce the intensity of the internal light rays.

If the optical constants of the layers of such a multilayer mirror could be switched between absorbing and non-absorbing values, then a mirror of adjustable reflectivity (i.e. a light modulator) would result. But traditionally, the optical constants of a material can only be slightly adjusted by, for example, electric fields (the Pockels effect), which is insufficient to make a reasonable spatial light modulator. Thus it is a problem in the known multilayer mirrors to switch the optical constants of the layers.

Quantum well devices are known in various forms, heterostructure lasers being a good example. Quantum well heterostructure lasers rely on the discrete energy levels in the quantum wells to achieve high efficiency and typically consist of a few coupled quantum wells; see, generally, Sze, Physics of Semiconductor Devices, 729-730 (Wiley Interscience, 2d Ed 1981). High Electron Mobility Transistors (HEMTs) are another type of quantum well device and typically use only one half of a quantum well (a single heterojunction) but may include a stack of a few quantum wells. The HEMT properties arise from conduction parallel to the heterojunctions and in the quantum well conduction or valence subbands; the conduction carriers (electrons or holes) are isolated from their donors or acceptors and this isolation limits impurity scattering of the carriers. See, for example, T. Drummond et al. Electron Mobility in Single and Multiple Period Modulation-Doped (Al,Ga)As/GaAs Heterostructures, 53 J. Appl. Phys. 1023 (1982). Superlattices consist of many quantum wells so tightly coupled that the individual wells are not distinguishable, but rather the wells become analogous to atoms in a lattice. Consequently, superlattices behave more like new types of materials than as groups of coupled quantum wells; see, generally, L. Esaki et al, Superfine Structure of Semiconductors Grown by Molecular-Beam Epitaxy, CRC Critical Reviews in Solid State Sciences 195 (April 1976). Chemla et al, U.S. Pat. No. 4,525,687 and T. Wood et al, High-Speed Optical Modulation with GaAs/GaAlAs Quantum Wells in a p-i-n Diode Structure, 44 Appl. Phys. Lett. 16 (1984) describe a multiple quantum well device for light modulation: an applied electric field perturbs the exciton photon absorption resonances near the fundamental edge of direct gap semiconductors and provides the modulation; the use of quantum wells confines carriers and enhances the exciton binding energy. Further, the applied field modifies the envelope wave functions of carriers in the quantum wells and thus the confinement energies and the exciton binding energy. The net effect of the quantum wells is a pronounced absorption by exciton resonances, and these resonances have energies which are easily modifiable by an applied electric field. However, such resonance is extremely sharp and it is a problem to modulate a fairly broad band of light.

Resonant tunneling devices are the simplest quantum well devices that exhibit quantum confinement and coupling and were first investigated by L. Chang et al. 24 Appl. Phys. Lett. 593 (1974), who observed weak structure in the current-voltage characteristics of resonant tunneling diodes at low temperatures. More recently, Sollner et al. 43 Appl. Phys. Lett. 588 (1983), have observed large negative differential resistance in such devices (peak-to-valley ratios as large as six to one have been obtained), and Shewchuk et al, 46 Appl. Phys. Lett. 508 (1985) and M. Reed, to appear, have demonstrated room temperature resonant tunneling. However, resonant tunneling devices have little optical application and it is a problem to apply resonant tunneling to optical devices.

SUMMARY OF THE INVENTION

The present invention provides a light modulator that can be switched from optically reflecting to optically absorbing and devices such as spatial light modulators including an array of such modulators. The light modulator relies on tunneling injection and withdrawal of carriers in semiconductors to vary the absorption of incident light. The modulator may include a stack of quarter wavelength plates of alternating first and second materials, and in preferred embodiments each plate of the first material is itself a multilayer stack of quantum wells and tunneling barriers coupling the wells or superlattices. Optical switchability arises from injecting and withdrawing carriers to and from the wells: absorption requires excitation of carriers from the well levels or minibands to quasi-continuum levels or other minibands and provides a somewhat broadband modulation. Optionally, both the first and second material plates are made of multilayer stacks of quantum wells or superlattices. These modulators solve the problems of variation of optical constants and the sharpness of response.

In other preferred embodiments each first material plate is a heavily doped n+ type layer and each second material plate is a heavily doped p+ type layer so the stack of quarter wavelength plates is also a stack of p+-n+ junctions. Switchability arises from bias variation of the junctions varying the depletion layer width and consequently the absorption of photons with energies near the bandgap energy. This leads to somewhat sharp photon energy response.

Further preferred embodiments use a single thin layer of a few quantum wells for carrier injection and withdrawal and this thin layer is separated from a mirror by a quarter wavelength plate.

DESCRIPTION OF THE PREFERRED EMBODIMENTS

Figure 2:
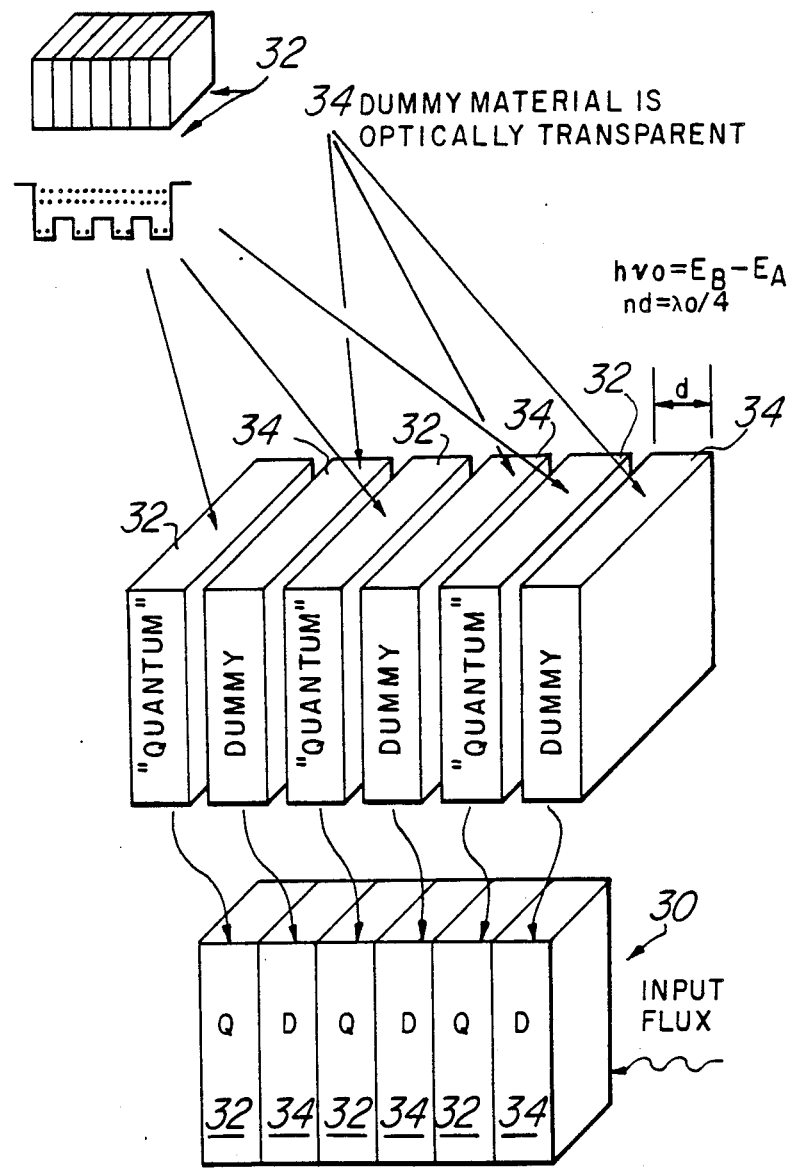
FIG. 2 is a schematic exploded view of a first preferred embodiment stacked modulator.

A first preferred embodiment stacked light modulator, generally denoted by reference numeral 30, is illustrated in schematic perspective exploded view in FIG. 2 and includes a stack of three layers 32 of active material, three layers 34 of transparent material, and surrounding material and electrodes, not shown for clarity. Active material 32 itself is composed of multiple layers of semiconductor material as suggested in the exploded portion of FIG. 2. The details of operation of modulator 30 are best understood after consideration of the properties of active material 32, which is itself a multilayer structure as suggested by the upper portion of FIG. 2.

Figures 3A, 3B:
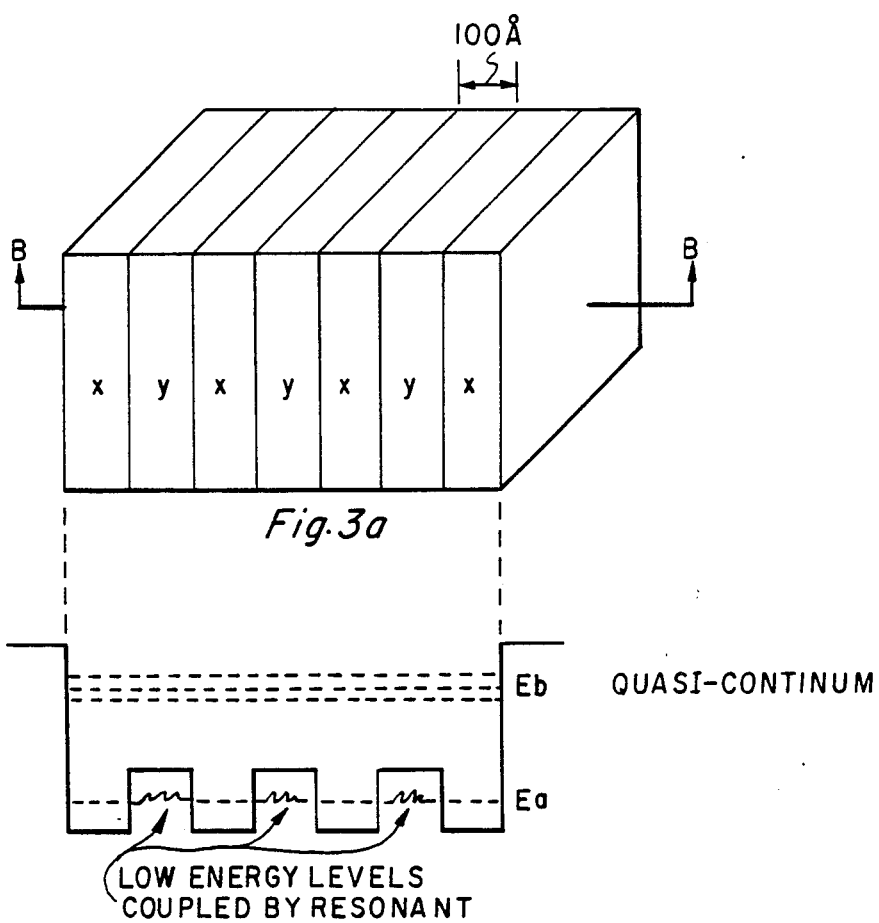
FIGS. 3A-B are a schematic perspective and conduction band edge views of a layer of the first preferred embodiment.

First consider a single crystal of alternating layers of undoped $Al_xGa_{1-x}As$ and undoped $Al_yGa_{1-y}As$ with the layers all about 100 Å thick (the height and width may be in the order of a few microns in applications and do not significantly affect the optical operation) as illustrated schematically in FIG. 3A wherein the layers are labelled by their composition; either x or y. The conduction band edge along line B-B through the alternating layers is schematically illustrated in FIG. 3B for $x=0.0, y=0.4$; note the x layers form quantum wells with barrier heights (the conduction band discontinuity at the interfaces of the x and y layers) of about 0.36 eV (360 meV). Note that these numbers are derived by using the generally accepted partition of the bandgap difference between AlGaAs alloys into 60% appearing as a conduction band discontinuity and 40% as a valence band discontinuity. As will be apparent from the following discussion, the partition has no particular effect on the operation of modulator 30 beyond adjusting the numbers.

The operation of modulator 30 depends on transition rates of electrons between levels in the conduction band wells and tunneling rates, and thus some approximate quantitative analysis will be used as an explanation aid. However, the approximations used and the analysis performed should not be construed to be part of modulator 30. In particular, we shall use an approximation for an electron in the conduction band which models the potential acting on the electron as equal to the conduction band edge, and the electrostatic field generated by other electrons in the same or other subbands in wells in the conduction band is accounted for by band bending. Further, the electron wave function will be presumed to be the product of a lattice periodic function (Bloch function) and an envelope function; the Bloch function in the $Al_xGa_{1-x}As$ layers will be taken to be of the same form as in the GaAs. For definiteness, the spatial coordinate system is chosen with x the variable along the direction of line B-B in FIG. 3A and y,z tthe variables parallel to the interfaces between the layers. Note that by tradition x and y are both as composition and spatial variables and are not to be confused.

The first calculation finds the energy Eigenvalues for an electron in the potential well formed by the x layers; this is a well in the x direction only, and thus the discrete energy levels calculated for y and z wave vectors equal zero will in fact be the bottoms of subbands with almost a continuum of levels corresponding to increasing y and z wave vectors due the large y and z dimensions. The effective mass approximation at the bottom edge of a subband presumes parabolic subbands (energy is a quadratic function of wavevector) and that the kinetic energy of an electron with wave vector $(k_x, k_y, k_z)$ is $$\frac{(hk_x)^2}{2m_l} - \frac{(hk_y)^2 + (hk_z)^2}{2m_t}$$

where $m_l$ is the effective mass in the x (longitudinal) direction and $m_t$ the effective mass in the y-z (transverse) directions. For calculations, taking both $m_l$ and $m_t$ equal to 0.067 times the rest mass of an electron amounts to using the bulk GaAs effective mass.

Now, consider the wave function of an electron in the lowest energy subband in an x well. We can approximate the wave function as follows:

$$\Psi_1(x,y,z;k_x,k_y,k_z) = \begin{cases} Au(.)e^{i(yk_y+zk_z)}e^{xk_1} & x \leq 0 \\ Bu(.)e^{i(yk_y+zk_z)}\sin(xk_2 + c) & 0 \leq x \leq 100 \text{ Å} \\ Cu(.)e^{i(yk_y+zk_z)}e^{-xk_3} & 100 \text{ Å} \leq x \end{cases}$$

where $A,B,C,c,k_1,k_2,k_3$ are determined by matching boundary conditions, $u(.)$ is the Bloch function, $k_y$ and $k_z$ are the wave vectors in the y and z directions, and $k_1,k_2,k_3$ are the x wave vectors in the three layers; note that the origin for the x coordinate has been taken to be at the interface of layers for convenience, and that $k_1,k_2,k_3$ will be the lowest of a discrete set of possible solutions for each $k_y,k_z$ pair. Also note that the potentials from the y layers have been approximated by constant potentials of infinite extent; and that the electron spin has been suppressed.

The ground state energy (unexcited level, bottom of the lowest subband edge) for well lies at approximately 100 meV above the conduction band edge (that is, the lowest subband bottom edge is 100 meV above the band edge), with the first excited state energy lying at about 250 meV, with more closely spaced states extending above, due to the proximity (in energy) of the top of the barriers and the different boundary conditions imposed on these excited states. See FIG. 3B for an indication of the energy levels important to the discussion.

Further, observe that if the lowest subband in a well were filled with electrons to a density of $1 \times 10^{12}/cm^2$, then the discrete energy levels are essentially shifted up by about 100 meV due to the electrostatic potential crated by the electrons, but the relative spacing of the energy levels has only a negligible change. Such an electron density is feasible in view of the density of states in a GaAs quantum well (approximately $3 \times 10^{13}/cm^2 eV$).

The barriers formed by the y layers are thin and low enough (about 260 meV above the ground level in the wells) for significant electron resonant tunneling between adjacent wells. In other words, the wells formed by the x layers are electrically coupled, so that electrons in one well would rapidly (on the order of 100 femtoseconds—see the resonant tunneling articles referenced in the Background) spread among the other wells.

Figure 4A:
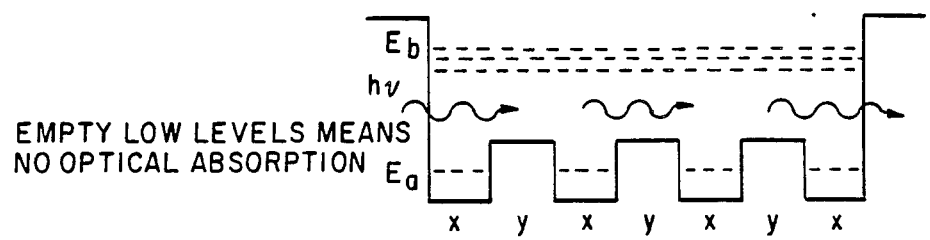
FIGS. 4A-B schematically illustrate transmission and absorption by a layer of the first preferred embodiment.
Figure 4B:
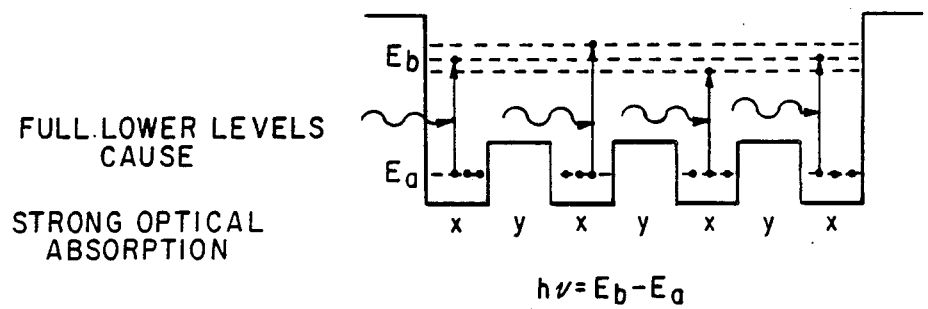

Now if the ground level (lowest subband) of the wells were unoccupied by electrons, then no optical absorption of photons of energy $E_b - E_a$ would occur where $E_a$ is the energy of an electron in the ground level and $E_b$ is the energy of an electron in the quasi-continuum above the y barriers but still within the crystal: see FIG. 3B and FIG. 4A. Note that in the Figures the conduction band edge above the quasi-continuum represents the conduction band edge for the transparent material or free electrons outside of the crystal and thus the energy difference $E_b - E_a$ may be almost as large as the electron affinity or work function for $Al_xGa_{1-x}As$ (about 4 eV) minus the electron affinity of the transparent material (as example. 0.9 eV for silicon dioxide). However, photons with energies greater than about 1.4 eV can be absorbed by direct excitation of an electron from the valence band to the conduction band (or bound impurity states close to the band edge) in GaAs ($Al_xGa_{1-x}As$ has a bandgap that increases with x), thus light with photon energies less than 1.4 eV (wavelength about 8,800 Å) are appropriate for modulator 30. Further, for transparent layers composed of AlAs, $E_b - E_a$ would be approximately 300 meV which suggest a vacuum absorption wavelength of about 4 microns (40,000 Å). And for light with photon energies about $E_b - E_a$ the crystal will have low absorption because the ground level (lowest conduction subband) is unoccupied. However, if the ground level were occupied by electrons, photons with energies about $E_b - E_a$ could be absorbed and excite the electrons up to quasi-continuum levels: see FIG. 4B. The excited electrons will relax back into the ground level by elastic photon emission and inelastic phonon emission. At a temperature above absolute zero, the relaxation process is dominated by spontaneous phonon emission: therefore, little spontaneous photon emission is expected. And the discrete nature of the energy levels tends to increase the optical transition matrix elements relative to conventional continuous systems which have a smooth variation in the joint density of states. This implies that generally discrete systems will have large dipole moments for optical absorption, thereby compensating somewhat for the reduction in the degeneracy of available energy levels. Further, the small dimensions of the wells (100 Å) may suggest small interaction with light of wavelength 40,000 Å, but the wells are coupled and the crystal is periodic to yield an interaction length comparable to the total length of the crystal. Indeed, the same small dimensions of the wells and barriers shows that the crystal does not have multiple internal reflections and itself does not act like a multilayer mirror. In short, the crystal acts as a uniform material electrooptically for near infrared light, and its optical constants depend strongly on the presence or absence of electrons in the ground level (lowest conduction subband). This heterostructure crystal is the active material 32 for modulator 30.

Modulator 30 includes three layers of active material 32 and three layers of transparent material 34; let the effective index of refraction of active material 32 be $n_1$ and the refractive index of transparent material 34 by $n_2$. Then the layers 32 and 34 are one quarter wavelength plates for a wavelength $\lambda_0$ if layers 32 all have a thickness of $d_1$ and all layers 34 have a thickness of $d_2$ where:

$d_3 = (\lambda_0 / 4 n_3)$ $j = 1.2$.

For example, presume infrared light with $\lambda_0 = 40.000$ Å and $n_1 = 4$, $n_2 = 2$; then $d_1 = 2.500$ Å and $d_2 = 5.000$ Å. So layers 32 each could be twelve wells and thirteen barriers, and transparent material 34 could be silicon nitride. Of course, each of the layers 32 and 34 could have its optical thickness increased by a multiple of a half wavelength, and this may be convenient in some fabrication methods.

Figure 5A:
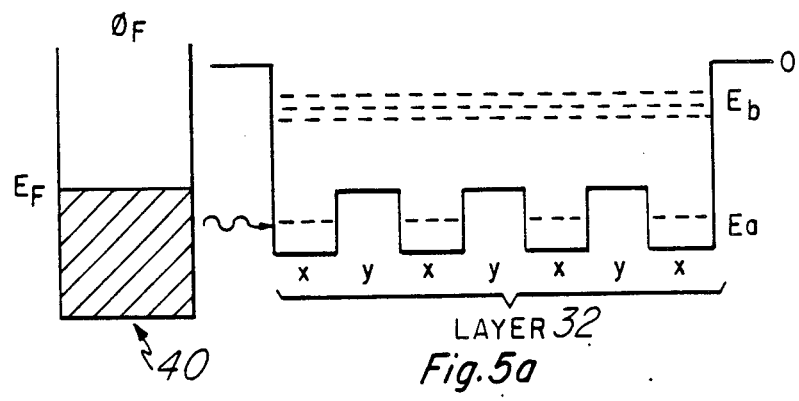
FIGS. 5A-C schematically illustrate injection and withdrawal of carriers to a layer of the first preferred embodiment.
Figure 5B:
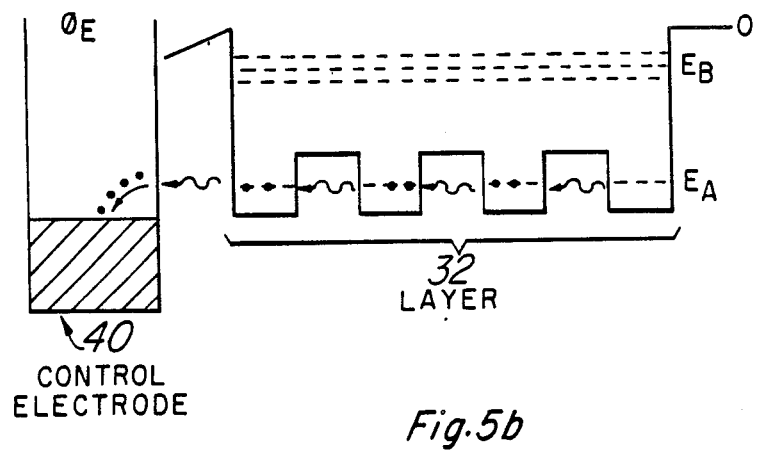
Figure 5C:
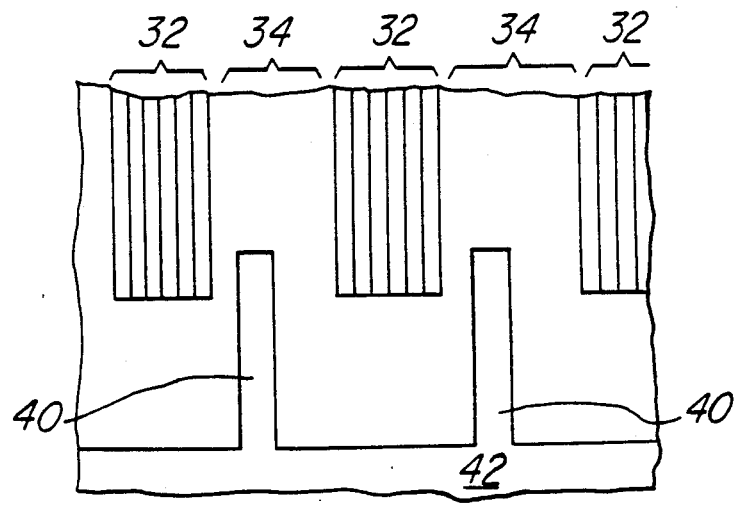

The control of the optical constants of layer 32 by injecting or withdrawing electrons from the ground level is performed with control electrode 40 placed in tunneling contact with one end of layer 32: see FIGS. 5A-B for the conduction band edge schematic view. In FIG. 5A the Fermi level of control electrode 40, which may be metal, is raised above the ground level of the x wells and electrons tunnel into the ground levels: whereas, in FIG. 5B the Fermi level of electrode 40 is lowered below the ground level of the x wells and the electrons tunnel out. FIG. 5C is a schematic cross sectional view of modulator 30 illustrating electrodes 40 contacting the layers 32 with a common bus 42 for electrodes 40. An alternative electorde 41 (not illustrated) could contact the x wells at their edges (bottom in FIG. 5C), but this is not as easy to fabricate as electrode 40 in planar processing (a Schottky barrier contact could provide electrode 41 plus a tunneling barrier at the edge of the x wells and be fabricated after all of the layered structure had been grown).

Figure 6:
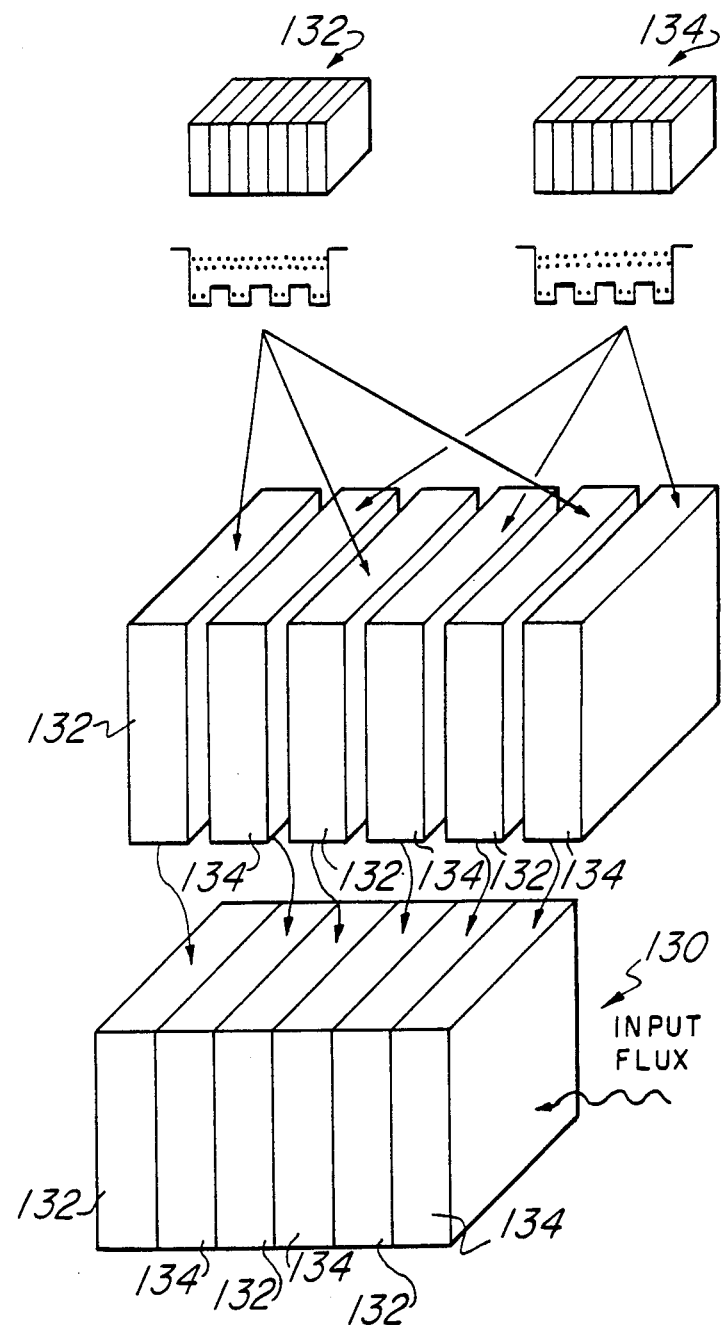
FIG. 6 is a schematic exploded perspective view of a second preferred embodiment.
Figure 7:
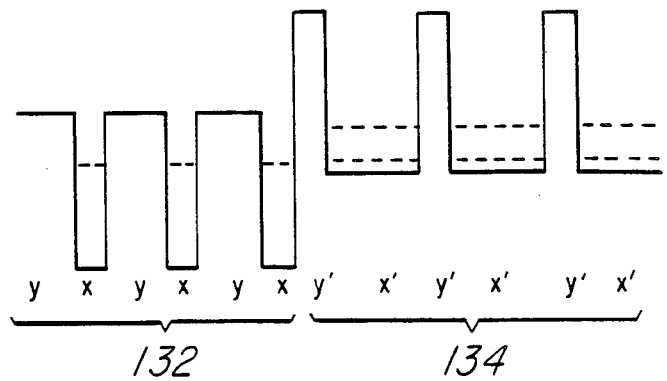
FIG. 7 is a conduction band edge diagram of a layer junction in the second preferred embodiment.

A second preferred embodiment modulator, generally denoted 130, is schematically illustrated in exploded view in FIG. 6 and is analogous to modulator 30. Modulator 130 includes alternating quarter wavelength layers 132 and 134, and both layers 132 and layers 134 are multilayered analogous to layers 32 of modulator 30. Layers 132 are made of $Al_xGa_{1-x}As$ and $Al_yGa_{1-y}As$ with x=0.0 and y=0.4 and layers 134 are made of $Al_xGa_{1-x}As$ and $Al_yGa_{1-y}As$ with x'=0.25 and y'=1.0: thus the wells in layers 132 are of about the same depth as the wells in layers 134, but the wells in layers 132 are much narrower to bring the ground level up to that of the wells of layers 134; see FIG. 7 which illustrates the conduction band edge at the junction of a layer 132 with a layer 134. Because the wells of both layers 132 and 134 are all coupled, a single electrode contacting the stack can inject and withdraw electrons for the optical switching function. The thickness of the y tunneling barriers can be varied without substantially affecting the energy levels; this allows for varying physical thickness to adjust to quarter wavelength constraints with a trade off of tunneling rate among the wells. The material of layers 132 is lower in aluminum on the average than the material of layers 134; this indicates a different index of refraction due to different polarizability (note that the x dependence of the index of refraction of $Al_xGa_{1-x}As$ at a wavelength of 9.000 Å is approximately $n(x)=3.590-0.710x+0.091x^2$). Thus layers 132 and 134 with appropriate thicknesses provide the alternating quarter wavelength plates for modulator 130.

Figure 8A:
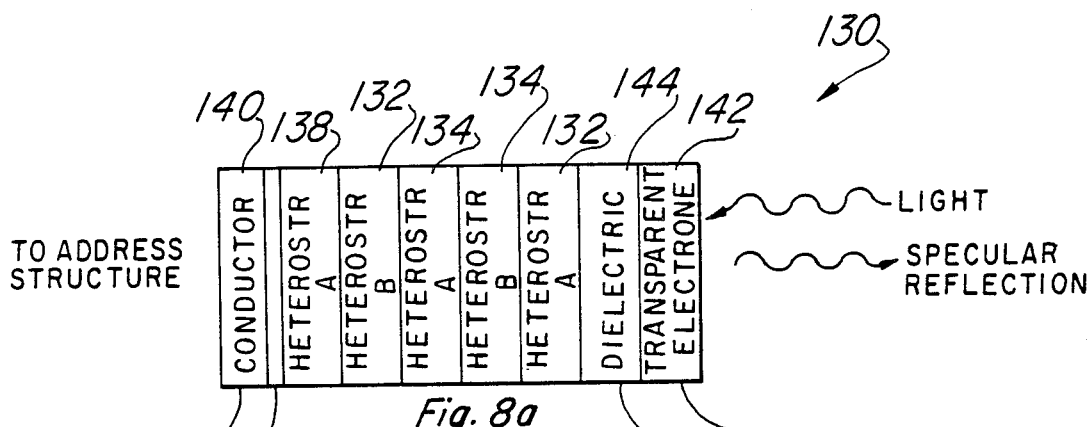
FIGS. 8A-C schematically illustrate injection and withdrawal of carriers to a layer of the second preferred embodiment.
Figure 8B:
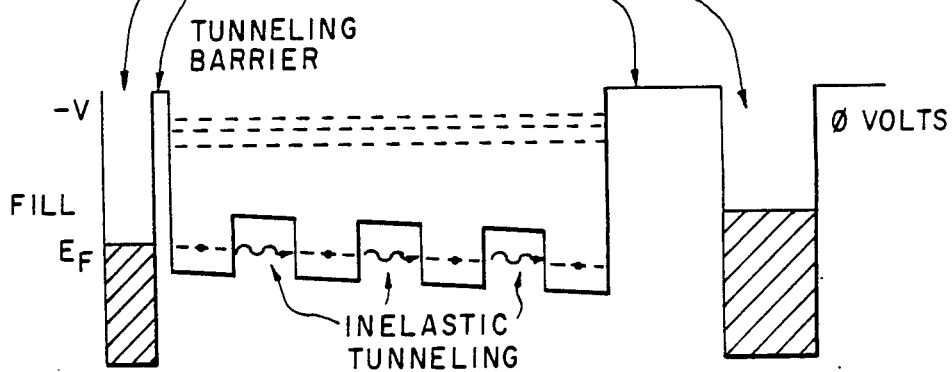
Figure 8C:
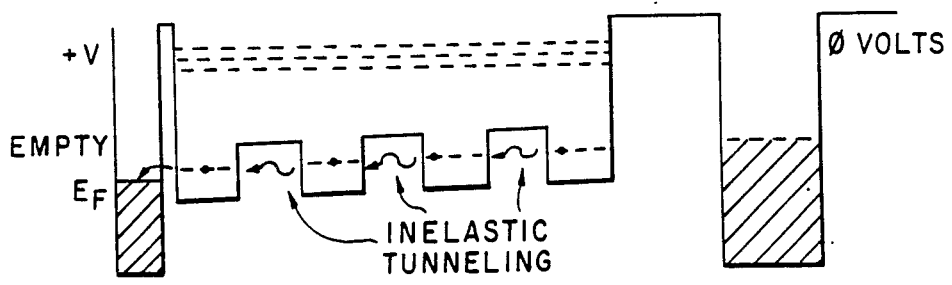

Modulator 130 may have electrodes connected to layers 132 and 134 by modification of electrode 40 of modulator 30, but the choice of well and barrier thicknesses yields a ground level of the wells of layers 132 at the same energy level as the ground levels of the wells of layers 134 which permits a simple pair of electrodes 140, 142 at either end of modulator 130 to apply a potential across modulator 130 and thereby tilt the conduction band edge and inject or withdraw electrons from the entire modulator by inelastic tunneling; see FIGS. 8A–C. Note that dielectric 144 may be silicon dioxide and electrode 142 is transparent such as indium tin oxide. Tunneling barrier 138 prevents Fermi level pinning.

Figure 9A:
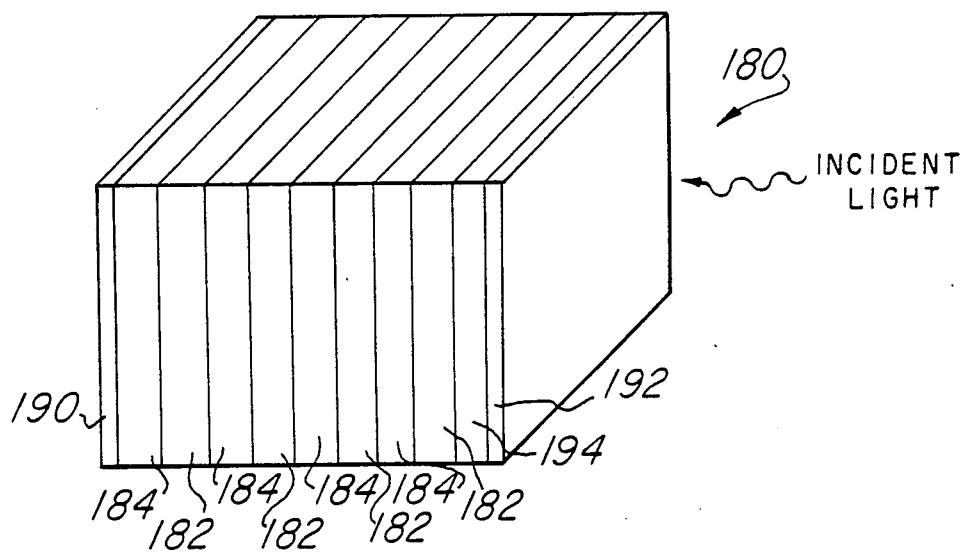
FIGS. 9A-C are schematic perspective view and band diagrams of a third preferred embodiment.
Figure 9B:
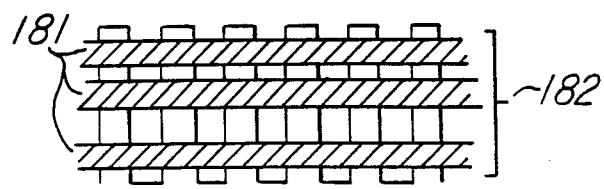

Third preferred embodiment modulator, generally denoted 180, is schematically illustrated in FIG. 9A and includes alternating layers of active superlattice 182 and transparent material 184 plus transparent electrode 192, dielectric 194, and address electrode 190. The layers 182 and 184 are analogous to layers 32 and 34 in that they are of quarter wave thickness and the active layers 182 may have their optical properties modulated: however, layers 182 are superlattices made of alternating GaAs wells and $Al_xGa_{1-x}As$ barriers with thicknesses so small (typically 20–40 Å) that the wells are tightly coupled and split the well energy levels to form minibands 181 throughout each layer 182. See FIG. 9B where the minibands are indicated by shading and also see G. Bastard, Superlattice Band Structure in the Envelope-Function Approximation, 24B Phy. Rev. 5693 (1981). The miniband energy spreads are adjustable by varying the thicknesses of the GaAs wells and $Al_xGa_{1-x}As$ barriers and by varying x, and the energy spreads of the minibands provide for absorption in a range of light wavelengths.

Figure 9C:
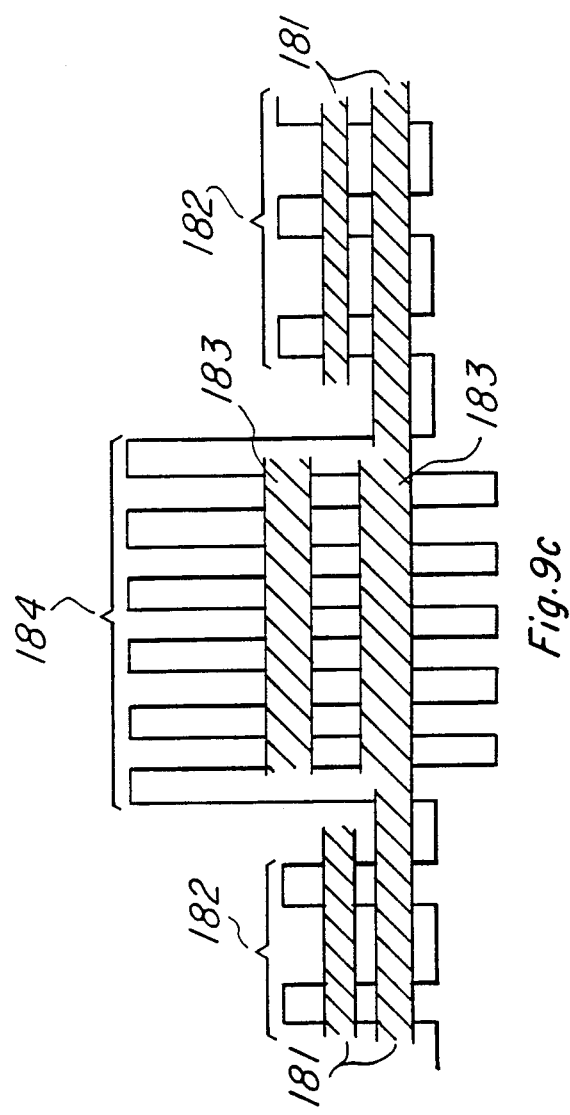

A fourth preferred embodiment modulator (not illustrated) can be made by replacing the transparent material layers 184 with superlattice layers with minibands 183: these superlattices would differ from the superlattices of layers 182 with minibands 181 in a manner analogous to the difference of 132 and 134 in modulator 130. FIG. 9C is a band diagram for this embodiment: note the common ground level for electron injection and withdrawal as was discussed in connection with modulator 130.

Figure 10A:
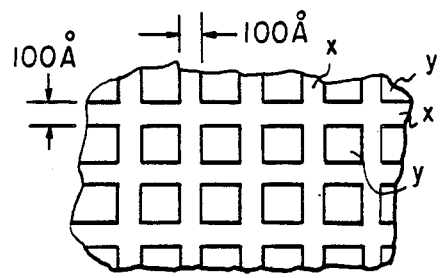
FIGS. 10A-C illustrate in plan and perspective view lateral confinement in the preferred embodiments.
Figure 10B:
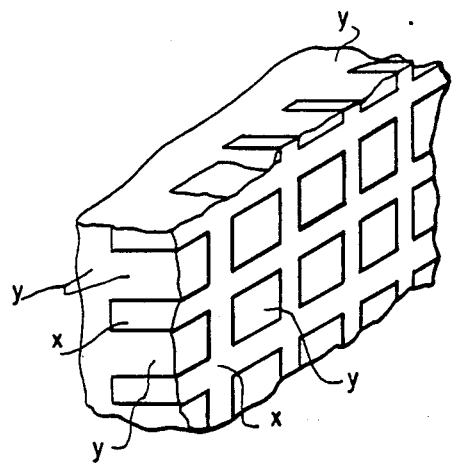
Figure 10C:
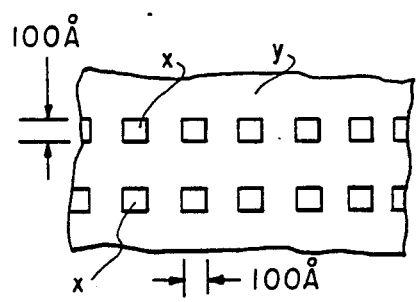

Lateral confinement of the electrons in the quantum wells or minibands of modulators 30, 130, and 180 increases the interaction of the electrons with the electromagnetic field of the incident light. Note that the electric and magnetic fields are parallel to the quantum well for light of normal incidence and thus the matrix element for photon absorption is proportional to $$\psi_f \cdot \nabla \psi_i e^{i\beta \cdot r} dV$$

where $\psi_i$ is the initial electron wavefunction, $\psi_f$ is the final electron wavefunction, and the vector potential for the electromagnetic field is given by:

$$A = \Sigma(a'\epsilon^{-i\beta \cdot r} + a\epsilon^{i\beta \cdot r})$$

with $\beta$ the frequency vector and e the polarization vector: summation subscripts have been suppressed. The point is that the matrix element has a factor of $e \cdot \nabla \psi_i$: this implies that the gradient of the initial wavefunction only in the plane of the quantum well or miniband enters the integral and that the confinement in the quantum well or miniband has little effect. Conversely, if the electron were also confined in a lateral direction, then the portion of the gradient arising from the envelope function in the plane would generally be much larger and the matrix element enhanced. Such lateral confinement is achieved by replacing each planar quantum well with either an array of ʃquantum wires" or "quantum dots" as partially illustrated in plan view in FIGS. 10-B. FIG. 10A shows in plan view a portion of an array of regions of $Al_xGa_{1-x}As$ labelled "x" which form a grid of horizontal and vertical strips about 100 Å wide with $Al_yGa_{1-y}As$ regions labelled "y" in between. FIG. 10B is a perspective view of the portion of FIG. 10A together with a y barrier in an orientation analogous to that of the x well plus y barrier in FIG. 3A which they replace. Of course, the width of the strips provides the confinement and the spacing and orientation of strips may be widely varied. FIG. 10C shows in plan view a portion of an array of $Al_xGa_{1-x}As$ regions approximately 100 A square and labelled "x" imbedded in $Al_yGa_{1-y}As$ labelled "y". The x regions are about 100 A apart which permits tunneling of electrons between the regions, and the size of the regions provides the lateral confinement.

Figure 11A:
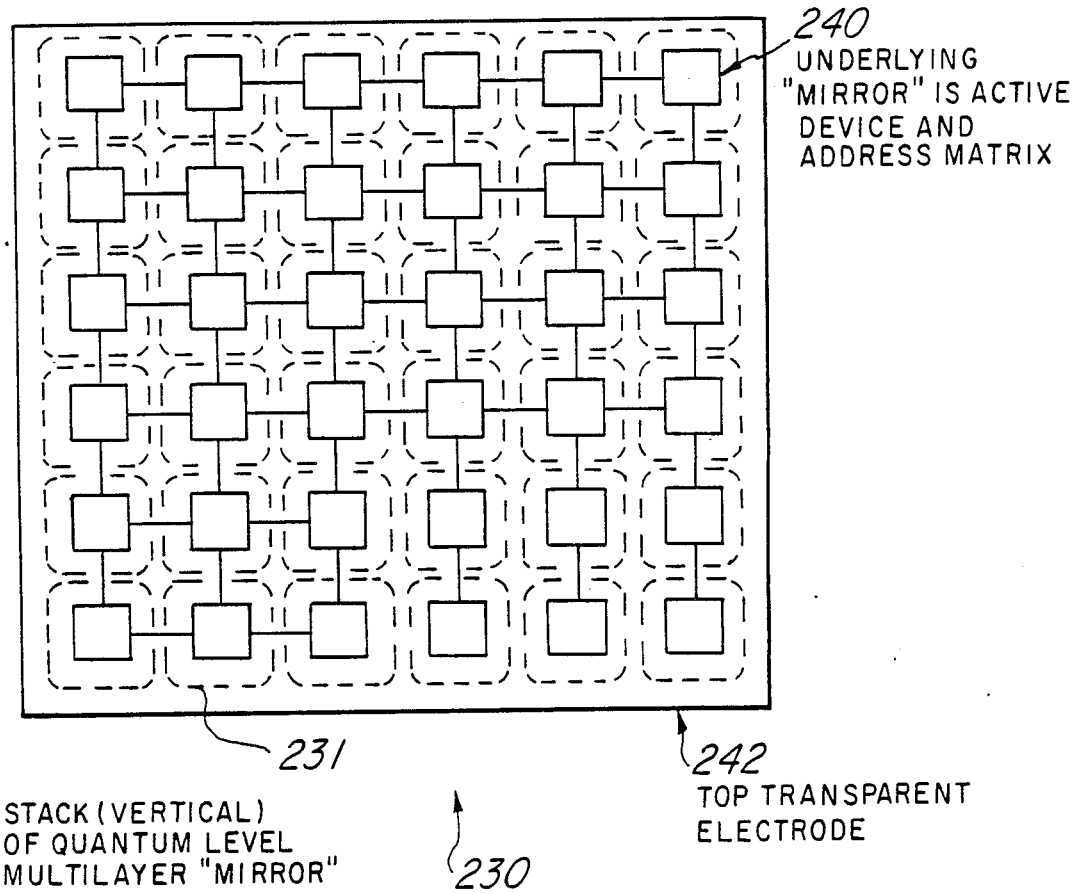
FIGS. 11A-B are schematic plan and cross sectional elevation views of a preferred embodiment spatial light modulator.
Figure 11B:
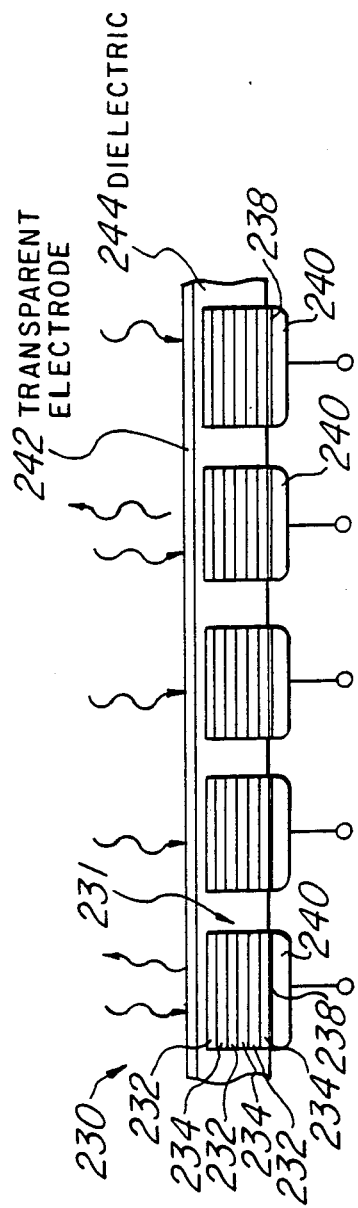

FIGS. 11A–B are schematic plan and cross sectional views of a spatial light modulator, generally denoted 230, composed of an array of modulators 231 each of which is similar to modulator 130 and constitutes a pixel of modulator 230. Thus modulator 230 operates in a band (recall FIG. 1B) about a center wavelength of light ($\lambda$) and the pixels are about 50$\lambda$ square and ($\lambda/2$) thick (six quarter wavelength plates with indices of refraction about 3.0 to 3.6) Each modulator 231 has an address electrode 240 and shares a common transparent electrode 242 on the incident light side of modulator 230. The arrangement of FIGS. 8A–C is applied to each pixel independently by its address electrode 240. The spacer between the pixels can be transparent or absorbing, in either case the incident light is not reflected except by pixels which have been biased to withdraw the conduction band electrons from the potential wells. Note that electrodes 240 are separated from the stack of quarter wavelength plates by tunneling barrier 238 of AlAs and could be made of highly doped n$^{--}$ $Al_xGa_{1-x}As$ with x selected to align the Fermi level of electrode 240 approximately with the ground level of the adjacent well. Electrodes 240 could be connected to various addressing circuits, such as shift registers along rows of electrodes, random access by multiplexers, and so forth.

Fabrication of modulator 230 may be achieved with standard processing steps as follows. An n+ epilayer of $Al_xGa_{1-x}As$ with x=0.0 is grown by molecular beam epitaxy (MBE) or metal organic chemical vapor deposition (MOCVD) to a thickness of three microns on a gallium arsenide substrate (this epilayer with eventually form electrodes 240). Next, a tunneling barrier of AlAs is grown followed by undoped epilayers of $Al_xGa_{1-x}As$ and $Al_yGa_{1-y}As$ alternately grown (by MBE or MOCVD) to form the stack of quarter wavelength plates of wells and barriers. Then silicon dioxide dielectric 244 is deposited by CVD to a thickness of 200 A, and transparent electrode 242 deposited by sputtering followed by a transparent protective coating: a support is then glued to the protective coating. The substrate is then thinned to remove all of the gallium arsenide, and the exposed n+ $Al_xGa_{1-x}As$ has photoresist spun on and patterned to define the pixels. The n+ $Al_xGa_{1-x}As$ and the stack are then plasma etched using the patterned photoresist as a mask: this etching is stopped at the silicon dioxide 244 and more silicon dioxide is deposited by CVD to fill in between the pixels. The photoresist is removed, metal contacts made to n+ $Al_xGa_{1-x}As$ electrodes 240, and the completed spatial light modulator is unglued from the support.

The lateral confinement illustrated in FIGS. 10A-C can be incorporated into spatial light modulator 230 by a patterning of the pixels that includes the quantum wire or quantum dot pattern: however, this will yield a slightly different structure in that the tunneling barrier laterally will be silicon dioxide rather than the $Al_yGa_{1-y}As$ illustrated in FIGS. 10A-C.

Figure 12A:
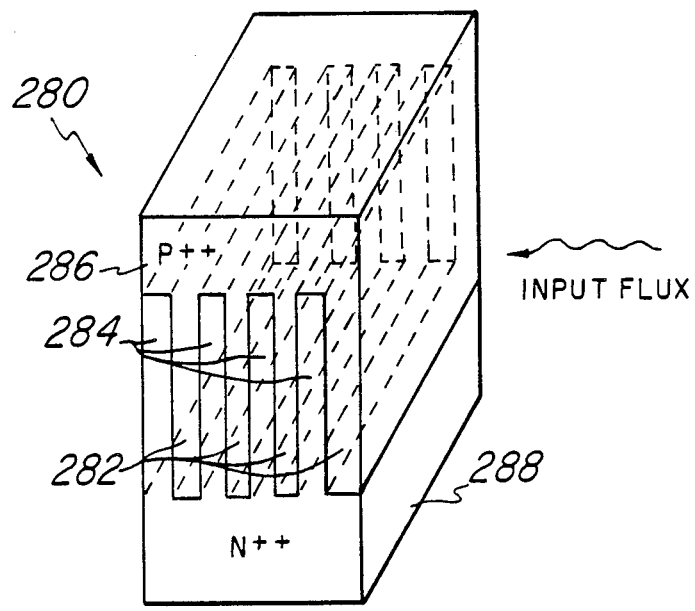
FIGS. 12A-C are schematic perspective view and band diagrams for a fifth preferred embodiment.
Figure 12B:
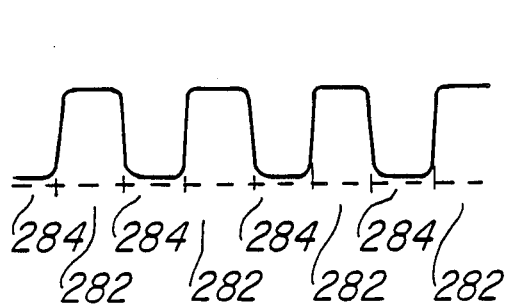
Figure 12C:
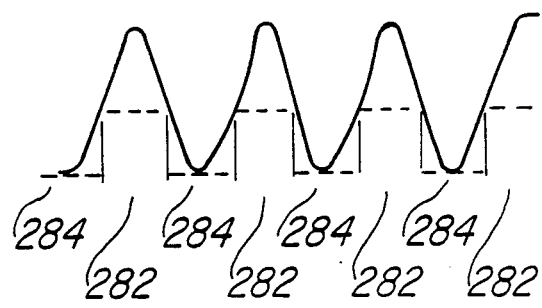

Fifth preferred embodiment modulator, generally denoted 280, is again a stack of quarter wavelength plates, but each plate is one half of a p-n junction rather than a multilayer of quantum wells and tunneling barriers. FIG. 12A is a schematic perspective view of modulator 280 illustrating the interleaved quarter wavelength plates with plates 282 doped p++ and connected to p++ contact 286 and plates 284 doped n++ and connected to n-- contact 288. For plates 282 and 284 each about 500 Å thick (quarter wavelength for λ=6,000 Å with index of refraction about 3.0), made of $GaAs_{0.55}P_{0.45}$ (direct bandgap of about 20 eV), and doped to carrier concentrations in the order of $1\times 10^{18}/cm^3$, the conduction band edge for the direction perpendicular to the plates (the direction of the incident light) appears in FIG. 12B and shows the thin depletion region at each of the junctions under a no bias condition. In contrast, FIG. 11C shows the complete depletion of the plates for an applied reverse voltage of about 3 volts between contact 288 and contact 286. This switching from thin depletion regions with heavy electron concentrations in the conduction band of plates 284 to complete depletion of these electrons provides optical modulation as an application of the Burstein effect as follows. The incident light to be modulated by modulator 280 is chosen to have photon energy just equal to the bandgap energy of the $GaAs_{0.55}P_{0.45}$, thus in the completely depleted condition each of plates 282 can absorb the light: however, in the minimally depleted condition plates 282 cannot absorb the incident light because the electron states near the conduction band edge are already occupied as a consequence of the n++ doping, and thus no valence band electrons can be excited into the conduction band by the incident light.

Modulator 280 may be fabricated by MBE growth of the alternating p++ and n++ layers followed by masking of the area to be optically active and a diffusion of implant of dopants such as zinc and silicon to convert the peripheral areas to the required p-- or n-- type. Modulator 280 may also be fabricated in a spatial array similar to spatial light modulator 230, although the biasing contacts would be between the individual modulators.

Figure 13:
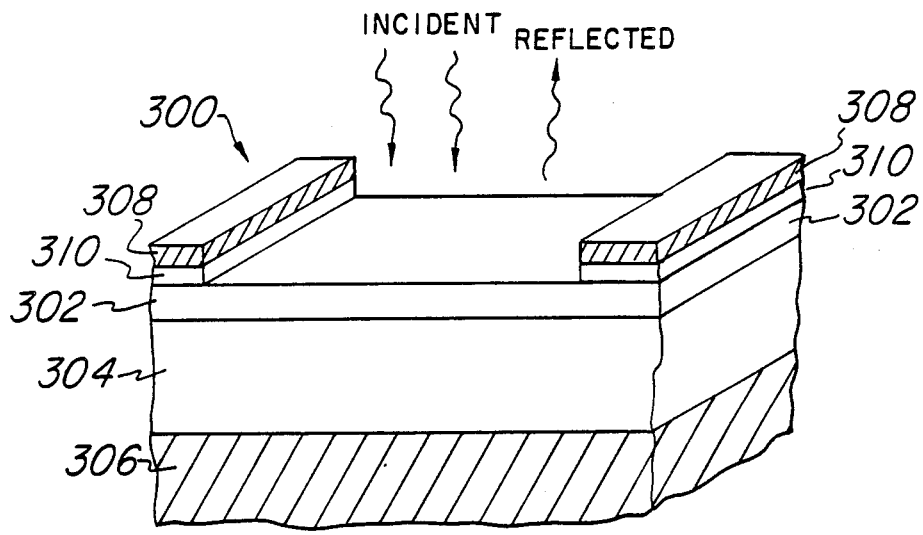
FIG. 13 is a schematic perspective view of a sixth preferred embodiment.
Figure 14:
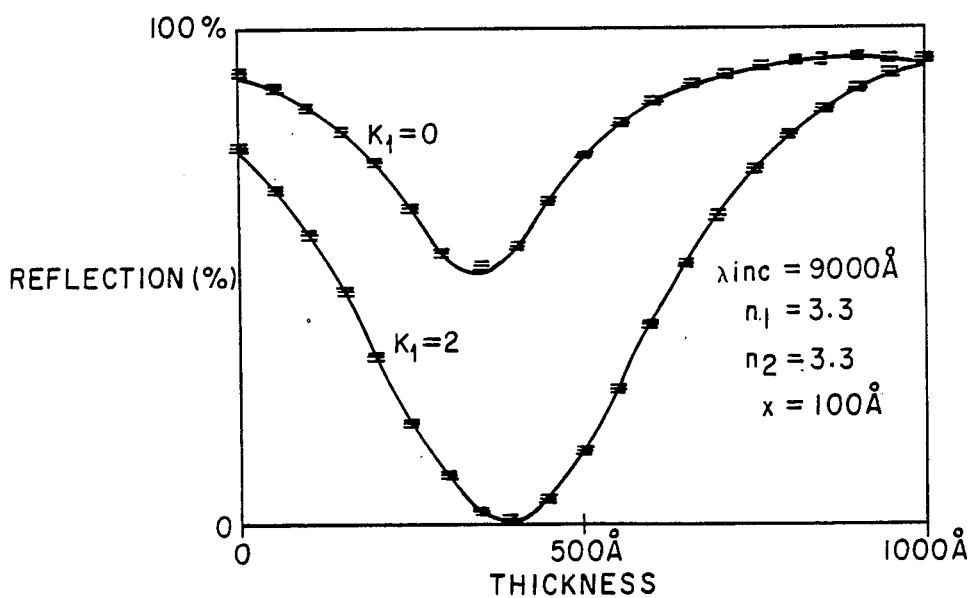
FIG. 14 is a graph of the dependence of reflectance upon layer thickness for the sixth preferred embodiment.

FIG. 13 illustrates in schematic perspective view sixth preferred embodiment modulator 300 which includes quantum well layer 302 of GaAs about 100 Å thick, transparent $Al_xGa_{1-x}As$ layer 304 about 400 Å thick, aluminum mirror 306, and electrode 308 with tunneling barrier 310. Quantum well 302 has carriers injected and withdrawn by tunneling from electrode 308 upon application of a voltage between electrode 308 and mirror 306: this is analogous to the injection and withdrawal described in connection with FIGS. 8A-C. As previously described, with injected carriers layer 302 is absorbing (optical constants n and k defined by $\epsilon = (n+ik)^2$ have values about n=3.3 for GaAs polarizability and k=2 for absorption by injected carriers) and with carriers withdrawn layer 302 is transparent (n=3.3 and k=0). The reflectance of modulator 300 as a function of the thickness of $Al_xGa_{1-x}As$ layer 304 is shown in FIG. 14 under the presumptions of incident light of wavelength 9.000 Å, optical constants for layer 304 n=3.3 and k=0 and for aluminum 306 n=0.6 and k=5.5. Variations of the thickness of layer 302, the wavelength of the incident light, and the index of refraction of the material of layer 304 provide analogous reflectance dependence on thickness which yields a zero minimum reflectance. Thus modulator 300 is chosen with layer 304 thickness to minimize reflectance at the center of the band of wavelengths of interest, and modulation is by the reflectance variation.

Modulator 300 can be modified by replacing electrodes 308 and tunneling barrier 310 with a transparent electrode covering all of the the surface of layer 302 similar to modulator 130. Also, aluminum mirror 306 can be replaced with a modulator 30 or 130 in the reflecting mode (carriers withdrawn); this can lead to simpler fabrication of modulator 300 in that all of the layers are $Al_xGa_{1-x}As$, but the electric field to bias into carrier injection into quantum well layer 302 will cross all of the layers. Quantum well layer 302 may be modified to increase coupling with the incident light in the same manner as shown in and discussed in connection with FIGS. 10A-C; again tunneling between the laterally confined quantum wells provides carrier transport. Also, modulator 300 may be fabricated in spatial arrays similar to spatial light modulator 230 except the common electrode would be aluminum mirror 306 and the individual pixel electrode would be electrode 308 which is on the front side of the array.

Figure 15:
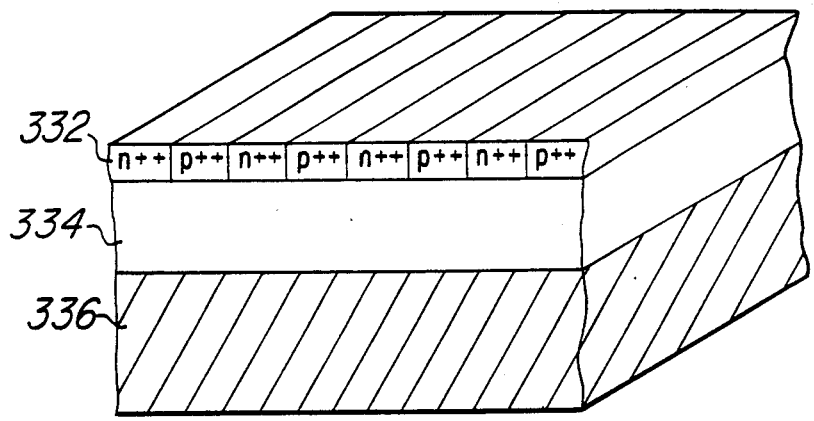
FIG. 15 is a schematic perspective view of a seventh preferred embodiment.

FIG. 15 schematically illustrates seventh preferred embodiment modulator 330 which is analogous to modulator 300 in that a single quantum well layer 332 (about 100 Å thick) is set over an approximate quarter wavelength transparent plate 334 on aluminum mirror 336; but in modulator 330 quantum well layer 332 is divided into p-- and n-- strips about 500 Å wide. The strips form p-n junction diodes and operate as the junction diodes of modulator 280 described previously.

Figure 16:
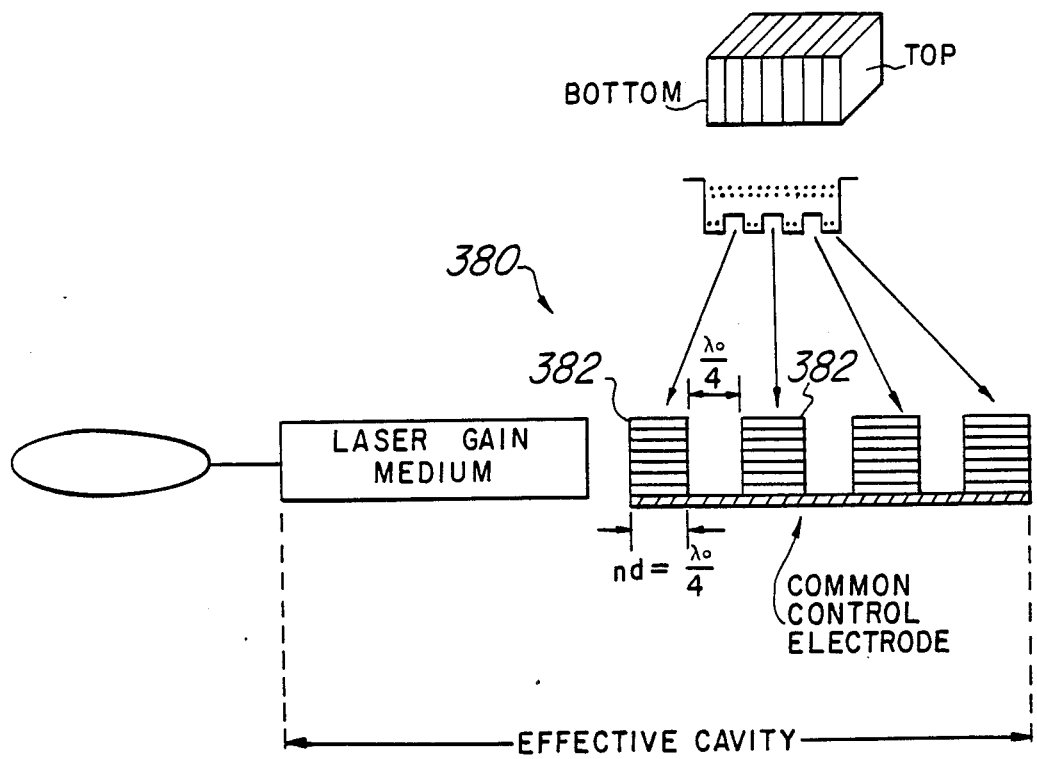
FIG. 16 is a schematic prespective view of an eighth perferred embodiment.

FIG. 16 illustrates use of a quarter wave grating 380 within a laser cavity to modulate the cavity Q. Quarter wave grating 380 includes stacks 382 of quantum wells that may have carriers injected and withdrawn as with modulator 130, but contrary to modulator 130, the quarter wavelength in grating 380 is measured perpendicular to the stacking direction as shown in FIG. 16. Thus each of stacks 382 has an optical thickness of one quarter wavelength (plus optional multiples of one half wavelength) and the stacks are separated by an optical distance of one quarter wavelength. Because the photons of the laser gain medium enter the stacks perpendicular to the stacking direction, the advantages of lateral confinement of the carriers in the quantum wells is inherent.

MODIFICATIONS AND ADVANTAGES

Figure 1A:
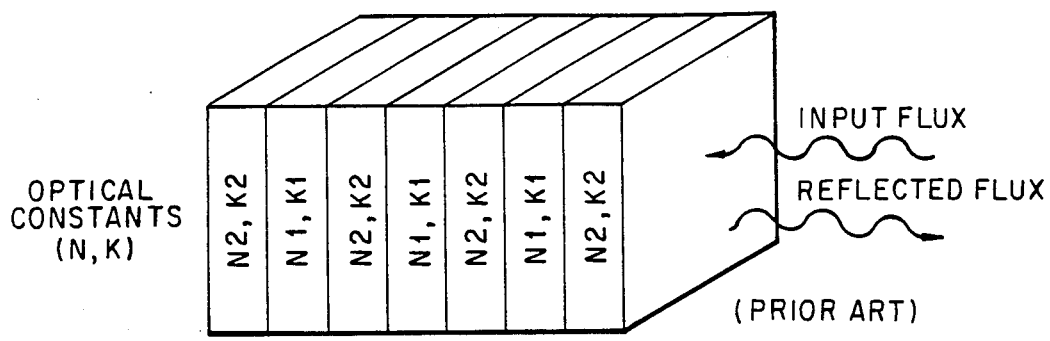
FIGS. 1A-C schematically illustrate stacked mirrors.
Figure 1B:
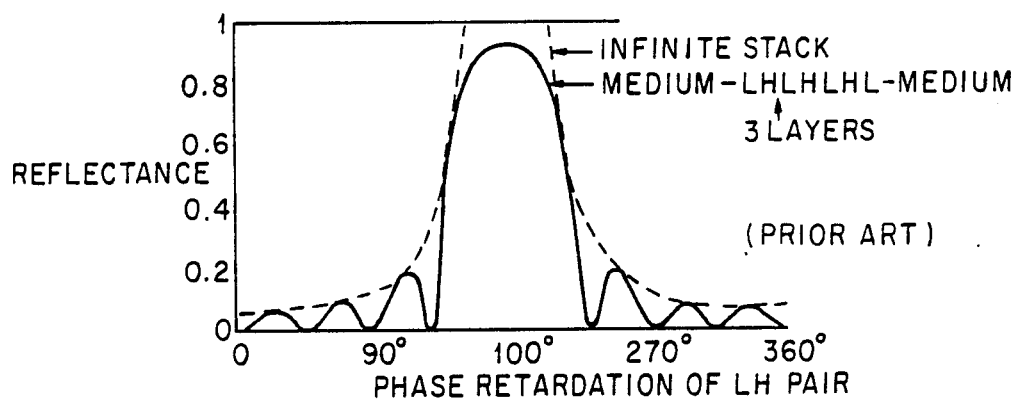
Figure 1C:
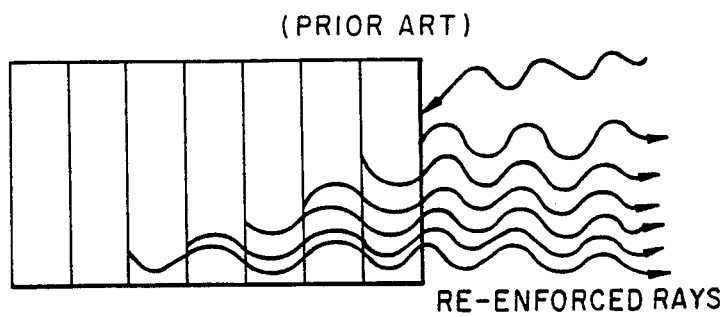

Various modifications of the preferred embodiment devices and methods may be made while retaining the optical modulation by carrier injection and withdrawal feature of the devices. For example, for the stack embodiments, the dimensions and shapes may be varied provided that quarter wavelength thickness is preserved; the number of wells and barriers in a layer may be varied; the number of quarter wavelength layers in a stack may be varied with more layers giving better optical effects as FIG. 1B illustrated; and the materials may be varied for different wavelength operation: a wide bandgap is needed to avoid valence band electron excitation for visible light in the first four preferred embodiments, so systems such as $Cd_xZn_{1-x}S$ may be useful. Whereas, the fifth preferred embodiment utilizes the excitation of valence band electrons. Further, the electrode materials and dielectric and tunneling isolation of the electrodes can be varied. Lastly, the modulator of Wood and Chemla (cited in the Background of the Invention) could be used as quarter wavelength plates, although carrier injection and withdrawal for optical excitation is not used.

The modulators provide a somewhat broadband light modulator with the quantum well and superlattice embodiments and are relatively simple to fabricate.

What is claimed is:
1. A light modulator, comprising:
   (a) a stack of alternating first and second quarter wavelength thick plates, said first plates each including alternating layers forming quantum wells and tunneling barriers with the ground levels in said wells of substantially the same energy: and
   (b) at least one electrode for injecting or withdrawing carriers from said ground levels in said wells, whereby light is absorbed by excitation of carriers in said ground levels to higher levels and light transmitted by a depletion of carriers from said ground levels.
2. The modulator of claim 1, wherein:
   (a) said light is infrared: and
   (b) said quantum wells and tunneling barriers are $Al_xGa_{1-x}As$ and $Al_yGa_{1-y}As$ with $x<y$, respectively.
3. The modulator of claim 2, wherein:
   (a) said tunneling barriers are sufficiently thin to couple said quantum wells to form minibands.
4. The modulator of claim 1, wherein:
   (a) said second plates each include alternating layers forming quantum wells and tunneling barriers with the ground levels of said second plate wells of substantially the same energy as the ground levels of said first plate wells.
5. The modulator of claim 4, wherein:

(a) said first plate tunneling barriers are sufficiently thin to couple said first plate quantum wells to form minibands.
6. The modulator of claim 5, wherein:
   (a) said second plate tunneling barriers are sufficiently thin to couple said second plate quantum wells to form minibands with the bottom edge of the lowest of said minibands at substantially the same energy as the bottom edge of the lowest miniband of said first plate.
7. The modulator of claim 1, wherein:
   (a) said tunneling barriers are sufficiently thin to couple said quantum wells to form minibands.
8. A light modulator for light of wavelength in a band about a center wavelength, comprising:
   (a) a stack of plates, said plates alternately first and second materials, each of said plates of optical thickness substantially equal to one quarter of said center wavelength plus a non-negative integral multiple of one half of said center wavelength; and
   (b) at least one electrode for injecting and withdrawing carriers into and from said first material plates, and each of said first material plates characterized by absorption of said light by excitation of said injected carriers and by transmission of said light in the absence of said injected carriers.
9. The modulator of claim 8, wherein:
   (a) said first material is a plurality of $Al_xGa_{1-x}As$ quantum wells separated by $Al_yGa_{1-y}As$ tunneling barriers.
10. The modulator of claim 8, wherein:
    (a) said first material is a superlattice.
11. The modulator of claim 8, wherein:
    (a) said electrode is separated from said first plates by tunneling barriers.
12. The modulator of claim 8, wherein:
    (a) said electrode forms a Schottky barrier with said first plates.
13. The modulator of claim 8, wherein:
    (a) said second material is characterized by transport of carriers through one of said second plates from an abutting first plate containing carriers to another abutting first plate.
14. A spatial light modulator for light in a band about a center wavelength, comprising:
    (a) an array of pixels, each of said pixels including:
       i. a stack of plates, said plates alternately first and second materials, each of said plates of optical thickness substantially equal to one quarter of said center wavelength plus a non-negative integral multiple of one half of said center wavelength; and
       ii. at least one electrode for injecting and withdrawing carriers into and from said first material plates, and each of said first material plates characterized by absorption of said light by excitation of said injected carriers and by transmission of said light in the absence of said injected carriers,
    (b) addressing circuitry for said electrodes.
15. A light modulator for light of wavelength in a band about a center wavelength, comprising:
    (a) a stack of plates, said plates alternately first and second materials, each of said plates of optical thickness substantially equal to one quarter of said center wavelength plus a non-negative integral multiple of one half of said center wavelength: and (b) electrodes for applying an electric field across said first material plates, and each of said first material plates characterized by absorption of said light by exciton resonances which are shifted by said applied electric field.

16. A light modulator for light of wavelength in a band about a center wavelength, comprising:
  (a) a stack of plates, said plates alternately first and second materials, each of said plates of optical thickness substantially equal to one quarter of said center wavelength plus a non-negative integral multiple of one half of said center wavelength:
  (b) said first material doped a first conductivity type, and said second material doped a second conductivity type:
  (c) a first electrode for connecting said first plates and a second electrode for connecting said second plates:
  (d) a voltage supply connected to said first and second electrodes for biasing the p-n junctions formed by said first and second plates; and
  (e) said doping characterized by substantially complete depletion of said plates at a reverse bias and minimal depletion at a forward bias.

17. A laser cavity Q modulator for a band of wavelengths about a center wavelength, comprising:
  (a) a plurality of stacks of plates of alternating first and second materials, said stacks of (i) stacking direction perpendicular to the direction between the cavity reflecting ends and (ii) optical width in said direction between ends equal to one quarter wavelength of said center wavelength and (iii) separation in said direction between ends equal to one quarter wavelength of said center wavelength: and
  (b) at least one electrode for injecting and withdrawing carriers into and from said first material plates, and each of said first material plates characterized by absorption of said light by excitation of said injected carriers and by transmission of said light in the absence of said injected carriers.

18. A light modulator for light in a band of wavelengths about a center wavelength, comprising:
  (a) a mirror:
  (b) a transparent layer on said mirror and of optical thickness about one quarter of said center wavelength; and
  (c) a thin layer on said transparent layer, said thin layer characterized by an optical thickness substantially less than said transparent layer thickness; and
  (d) electrodes for injecting carriers into and withdrawing carriers from said thin layer, said thin layer characterized by absorption of light at said center wavelength by excitation of said injected carriers.

19. The modulator of claim 18, wherein:
  (a) said mirror is a stack of quarter wavelength thick $Al_xGa_{1-x}As$-based materials:
  (b) said transparent layer is $Al_xGa_{1-x}As$; and
  (c) said thin layer is $Al_yGa_{14-y}As$.

20. The modulator of claim 18, wherein:
  (a) said thin layer is an array of laterally quantized regions separated by carrier tunneling distances.

* * * * *